July 23, 1957 M. K. HAYNES ET AL 2,800,280

COMPARING SYSTEM

Filed May 17, 1954

*INVENTORS*
MUNRO K. HAYNES
WILLIAM W. LAWRENCE
GORDON E. WHITNEY

*BY* William V. Schellberg

AGENT 2,800,280
Patented July 23, 1957

2,800,280

COMPARING SYSTEM

Munro K. Haynes and William W. Lawrence, Poughkeepsie, N. Y., and Gordon E. Whitney, Derby, Colo., assignors to International Business Machines Corporation, New York, N. Y., a corporation of New York Application May 17, 1954, Serial No. 430,136

6 Claims. (Cl. 235—61.7)

This invention relates to accounting machines of the perforated card controlled type and is directed in particular to a system in which perforations in successive cards are compared for performing various control purposes.

Means for comparing perforations in two cards to determine if the information represented thereby is alike or unlike has utility in accounting machines for controlling certain machine functions as for example in automatic group control systems for record controlled tabulators. Machines of this type are designed to add, list and print totals of items entered into the machine from control records on which the items are represented by index point perforations located at different positions in the several card columns, each column ordinarily representing one character which may be alphabetical or numerical.

The record cards are usually divided into groups representing classifications with the several classifications indicated by similarly located card perforations. It is desirable to continue automatic feeding of the cards as long as the group classification remains the same but to interrupt the card feed for the purpose of taking totals or performing other functions when the group classification changes. This is ordinarily accomplished by providing two sets of analyzing brushes which are spaced apart so that one card feeds to one set as the preceding card feeds to the other set and corresponding index positions on both cards are sitmultaneously sensed.

Tabulating machines which analyze and control with the record cards in motion are ordinarily of the electrical type and the analyzing mechanism consists of a contact roller cooperating with the individual brushes of each set. Automatic group control is normally accomplished by provision of a circuit including the two sets of analyzing brushes in series, and, if the cards under the two sets contain identical controlling perforations this circuit will be closed to keep the card feed active and to advance a further card during a succeeding card cycle. If the controlling perforations are not identical in successive cards, this series circuit fails to make and the tabulator either stops or automatically takes a total.

In systems of the type described, it is necessary that the records cards be precisely aligned, so that the several sensing brushes make in coincidence in order to provide sufficient time to operate the electro-magnetic relays employed for continuing the card feed cycle.

In certain classes of work, the existing forms of automatic group control mechanism cannot be satisfactorily employed and it is accordingly a principal object of the present invention to provide a system for comparison of perforations in record cards which is designed for more varied conditions.

A further object of the invention resides in the provision of a system in which all the index point positions of several columns are compared simultaneously row by row but the sensing of perforations in successive cards need not be simultaneously accomplished.

In carrying out the invention a pair of magnetic cores is used for each position of comparing desired. A perforation sensed in a first record card causes one of the pair of cores to assume a magnetic state opposite that to which it is initially set and a perforation sensed in a succeeding record card causes the other of the pair of cores to assume a like magnetic state. Output windings on the two cores are connected in opposition so that on read out, if both cores are set to the same magnetic state, the induced voltages are cancelled and no output is obtained. On the other hand, if the magnetic state of only one of the cores is changed, an output pulse is obtained indicating that the two record cards being compared are unlike and this signal may be employed for controlling purposes as described. Accordingly, a further object of the invention is to provide a magnetic core comparing device for automatic group control.

Other objects of the invention will be pointed out in the following description and claims and illustrated in the accompanying drawings, which disclose, by way of example, the principle of the invention and the best mode, which has been contemplated, of applying that principle.

Figures 1, 2:
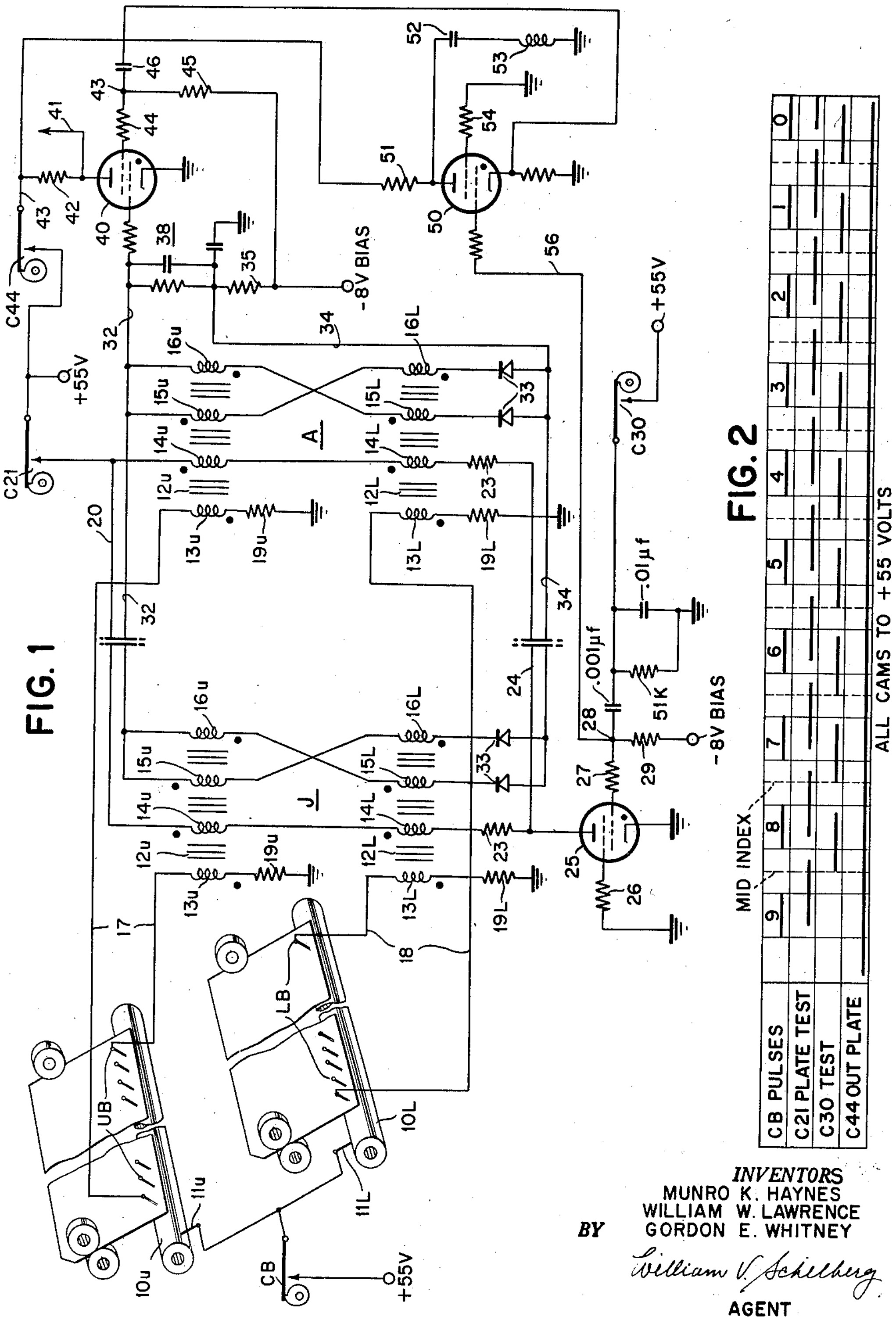
Figure 1 is a wiring diagram of the electrical circuits of a magnetic core comparing device.
Figure 2 is a timing chart showing diagrammatically the relative timing of pertinent electrical devices relating to the circuit of Figure 1.

The present magnetic core comparing device is applicable to existing machines operating on either stationary or moving cards and in connection with single or combinational perforations systems. The particular type of machine does not enter into the present invention as it is immaterial if single or combinational hole cards are analyzed at rest or in motion. Reference may be made to the patent of A. W. Mills, No. 2,079,418, for a machine of the type to which the present invention is particularly adaptable.

Referring now to the drawings, the machine is provided with two sets of sensing brushes UB and LB past which record cards are moved from a supply hopper not shown. The cards are fed 9 edge first and the two brush stations are spaced apart so that as one card is positioned under the lower brush set LB, the succeeding card is similarly positioned under the upper brush set UB. As a perforation is sensed in the cards, contact is made with a conductive roller element 10–U or 10–L, which elements are maintained at a positive potential by connection from a +55 volt source through a circuit breaker CB and the sets of brushes 11–U and 11–L respectively.

A plurality of comparing units A to J, are arranged in parallel. Each of these units comprise two magnetic cores 12U and 12L each of which cores is provided with four windings. Windings 13 comprise input windings, windings 14 comprise read out or test windings and windings 15 and 16 comprise output windings. The brushes UB and LB, corresponding with the columns of the record card to be compared, are connected to one terminal of the input winding 13 of the upper and lower pair of cores through leads 17 and 18, respectively. The remaining terminal of the several windings 13 is connected to ground through individual 10K resistors 19. The windings 14U and 14L of each comparing unit are connected in series with each series connected pair coupled in parallel through a lead 20 to a cam operated contact C21, which when closed, energizes lead 20 at +55 volts. Closure times of the contact C21 are indicated in the timing chart of Figure 2 as will be more fully described hereafter. The remaining terminal of the series connected pair of windings 14U and 14L are connected through resistors 23 in parallel to a lead 24 which connects with the plate of a thyratron tube 25. The cathode of tube 25 is grounded and the second grid is connected to ground through a 10K ohm resistor 26. The control grid is connected through a 10K ohm resistor 27 to a terminal 28 which is biased negatively by connection through a resistor 29 to a —8 volt source. The terminal 28 is also connected through a cam operated switch C30 which applies a +55 volt potential to this terminal on closure as shown in the timing chart of Figure 2.

A dot marking is placed adjacent one end of the windings on the several cores to indicate the polarity of voltages induced therein. That end of the winding has a negative potential on read in and a positive polarity on read out or test. The output windings 15 and 16 are oppositely wound, as indicated, and the windings 15U are connected in series with the windings 16L in each comparing unit while the windings 15L and 16U are similarly connected. Each series coupled pair of windings is connected at one end to a lead 32 and at the other end through individual selenium rectifiers 33 to another lead 34 so as to be in parallel. The lead 34 is maintained at a negative bias by connection through a resistor 35 to a —8 volt source and the lead 32 is connected through a conventional network 38 to the control grid of a thyratron 40. The plate of this tube is connected to an output lead 41 and through a resistor 42 to a lead 43 which is energized at +55 volts upon closure of a further cam operated switch C44. The cathode of tube 40 is grounded and the second grid connected to a terminal 43 through a resistor 44. Terminal 43 is connected to the aforementioned —8 volt bias source through a resistor 45 and through a condenser 46 to the cathode of a thyratron gate tube 50. The plate of the tube 50 is connected through a 15K plate resistor 51 to the lead 43 and through a capacitor 52 and inductance coil 53 to ground. The second grid is grounded through a 10K ohm resistor 54 and the control grid is connected through a resistor 55 and lead 56 to the aforementioned terminal 28.

The cam switches CB, C21, C30 and C44 are driven in synchronism with the card feeding mechanism and are closed for periods as indicated graphically in Figure 2.

At each index time of feeding record cards past the upper and lower analyzing stations, the switch CB closes as indicated and current may flow from the +55 volt source and brushes 11U and 11L to the sensing brushes UB and UL through a hole in the card. The leads 17 and 18 direct these pulses to the windings 13. With all the magnetic cores 12 in a datum remanence state initially, a pulse sensed from a perforated card at the upper reading station passes through the lead 17 and the winding 13U of the corresponding comparing unit for the particular column. Similarly, presence of a perforation in a second card located at the sensing station LB, applies a pulse to the corresponding winding 13L during this period but the pulses need not be precisely synchronized. The windings 13 have 200 turns in series with the 10K resistor 19 to limit the flow of current and the cores are completely switched to the opposite remanence state when pulsed as described. Either one, both, or neither of the cores 12U and 12L may be switched depending upon the presence or absence of card perforations. After the simultaneous sensing of a row of digit positions on the pair of cards, the contacts C21 close and a potential of +55 volts is applied to the plate of the thyratron 25 through the series connected windings 14U and 14L on each pair of cores. At mid-index time, as seen in Figure 2, the cam contact C30 closes and overcomes the —8 volt grid bias to fire tube 25. This causes the cores 12 to be driven toward their datum remanence magnetic states by the current pulse applied through the windings 14U and 14L. If a particular one of the cores has been switched, an output voltage is induced in the associated windings 15 and 16 on collapse of the remanent magnetic field and rapid build up of flux in the opposite direction. If the particular core had not been switched, negligible voltages are induced in the associated output windings as it is driven from the remanence state to saturation in the same direction. The induced voltages are of a polarity indicated by the dot markings and it may be observed that if both cores were switched by the pulsing of tube 25, equal and opposing voltages are induced in the cross coupled windings 15 and 16. With only core 14U switched, as when a perforation had been sensed in the card at the upper brush station without a corresponding perforation in the card at the lower brush station, a voltage is induced in the windings 15U and 16U with negligible voltage induced in the windings 15L and 16L. The voltage of coil 15U is unopposed by that of winding 16L, however, current flow is blocked by the series diode 33. The voltage appearing in coil 16U, however, is of proper polarity to pass the diode 33 connected in series with coil 15L and current flow through the network 38 biases the grid of tube 40 to fire. As shown in the timing chart of Figure 2, cam contacts C44 are closed during this period and presence of a positive grid bias causes conduction and a controlling signal pulse appears on the output lead 41 indicative of a failure in comparison or a group change.

In a similar manner, with a perforation sensed in the card location at the lower brush station without a corresponding perforation in the card in the upper brush station, the core 14L would switch remanence states while core 14U remained in the datum magnetic state. In this case the induced voltage in coil 15L will overcome the small voltage induced in coil 16U to apply a controlling pulse to the tube 40 and cause an output pulse to be produced in like manner.

With neither one or both of the cores switched, as when the presence or absence of a perforation is sensed in a particular column of both cards, the voltage induced in the windings 15 and 16 are equal and in opposition so that the tube 40 does not become conductive. If each pair of cores is not matched, however, so as to give the same volt-time pulse output, a remainder voltage may result when the shorter of the two induced pulses ends. The function of the tube 50 is to control the firing of tube 40 during the first half of the core read-out pulse in order to avoid such erroneous response. A positive pulse of approximately 32 volts and about 82 microseconds' duration is developed at the cathode of tube 50 and is directed to the second grid of the tube 40 at the same time that all the cores are read out or at mid-index time. Thus, only during this 82 microseconds time interval can the tube 40 fire on receipt of pulses on lead 32 and the control grid. In this manner the necessity for matching the characteristics of each pair of cores is eliminated and the reliability of circuit operation increased.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a group control system for a tabulating machine responsive to record cards having columns of differently located index point positions, a pair of sensing devices for sensing a column in each of a pair of record cards, one sensing device sensing the different positions in the column of one card in succession while the other sensing device substantially concurrently and in like manner senses the correspondingly located positions in the column of the second card, a magnetic storage element for each sensing device and having an input winding thereon, circuit connections completed by each sensing device upon sensing a perforation at an index point position for energizing its related input winding, a readout winding on each said magnetic storage element adapted to be pulsed for resetting said storage element to a datum residual state, first and second output windings on each said storage element, said output windings being oppositely wound and of a like number of turns, circuit means connecting said output windings of said pair of cores in series opposition, means connecting said series connected output windings in parallel and to a control device, and means for energizing said read out windings after sensing each index point position and before the next succeeding index point position is sensed so as to actuate said control device on failure of comparison of perforations in the pair of record cards.

2. In a group control system for a tabulating machine responsive to record cards having columns of differently located index point positions, a pair of sensing devices for sensing a column in each of a pair of record cards, a magnetic storage element for each sensing device and having an input winding thereon, circuit connections completed by each sensing device upon sensing a perforation at an index point position for energizing its related input winding and causing said storage element to assume a first residual state, a read-out winding on each said magnetic storage element adapted to be pulsed for resetting said storage element to a datum residual state, first and second output windings on each said storage element, said output windings being opopsitely wound and of a like number of turns, circuit means connecting each said output windings of said pair of cores in series opposition, said circuit means including a unidirectional conducting device, means connecting said series connected output winding circuits in parallel and to a load device, and means for energizing said read-out windings after sensing each index point position and before the next succeeding index point position is sensed so as to actuate said load device on failure of comparison of perforations in said pair of record cards.

3. Apparatus as set forth in claim 2 wherein means are provided coupled to said load device and adapted to condition said load device for operation for a limited duration after operation of said means for energizing said readout windings.

4. An exclusive or circuit comprising a pair of magnetic storage elements, each including a core of magnetic material capable of assuming alternate states of magnetic stability, a read-in winding on each core adapted to be pulsed for causing the storage element to assume one magnetic state, a read-out winding on each core adapted to be pulsed for resetting the storage element to the other magnetic state, first and second output windings on each core wherein voltage pulses are induced in response to a change in the magnetic state of the storage element, said output windings being oppositely wound and of a like number of turns, circuit means including a diode connecting the output windings of said pair of cores in series opposition with said series connected pairs of windings coupled in parallel and connected to a load device, and means for conditioning said load device during pulsing of said read-out winding.

5. A comparing circuit for comparing perforations in a pair of record cards, comprising a pair of magnetic storage elements, each including a core of magnetic material capable of assuming alternate stable states of magnetic stability, a read-in winding on each core adapted to be pulsed for causing the storage element to assume one magnetic state, a read-out winding on each core adapted to be pulsed for resetting the storage element to the other magnetic state, first and second output windings on each core wherein voltage pulses are induced in response to a change in the magnetic state of the storage element, said windings being oppositely wound and of a like number of turns, output circuit branches connecting the output windings of said pair of cores in series opposition and in series with a unidirectional conducting device, circuit means coupling said output circuit branches in parallel and to a load device for operating said load device on failure in comparison of said record cards, means for energizing said read out winding after sensing each index point position and before the next index point position is sensed, and means coupled to said load device adapted to condition said load device for operation for a limited duration after operation of said means for energizing said read-out windings.

6. A device for comparing perforations in record cards comprising a pair of magnetic storage elements, each including a core of magnetic material capable of assuming alternate stable states, a read-in winding inductively associated with each core and adapted to be energized for causing the storage element to assume one of said stable states, a drive winding associated with each core and adapted to be energized for causing the storage element to assume the other of said stable states, a pair of output windings on each said core and adapted to develop an induced voltage in response to a change in the stable magnetic state of the associated core, said output windings being of a like turns ratio and wound in opposition, circuit means connecting output windings of opposite polarity on each said pair of cores in series, a diode in series with each said circuit means, means coupling each series connected pair of output windings and diode in parallel and to a load device, and means conditioning said load device during energization of said drive windings for indicating a failure in comparison of perforations in said record cards.

References Cited in the file of this patent

UNITED STATES PATENTS 2,695,993 Haynes ---------------- Nov. 30, 1954